Dec. 31, 1940. L. C. ROBERTS Re. 21,681

SELECTIVE TELEGRAPH SYSTEM

Original Filed Jan. 19, 1928 2 Sheets-Sheet 1

INVENTOR
L.C.ROBERTS
BY Roger W. Wolf.
ATTORNEY

SELECTIVE TELEGRAPH SYSTEM

Original Filed Jan. 19, 1928 2 Sheets-Sheet 2

INVENTOR
L. C. ROBERTS
BY Roger W. Wong
ATTORNEY

Reissued Dec. 31, 1940

Re. 21,681

UNITED STATES PATENT OFFICE 21,681

SELECTIVE TELEGRAPH SYSTEM

Leland C. Roberts, Towaco, N. J., assignor to American Telephone and Telegraph Company, a corporation of New York Original No. 1,700,180, dated January 29, 1929, Serial No. 247,886, January 19, 1928. Application for reissue August 21, 1940, Serial No. 353,578

6 Claims. (Cl. 178—2)

Figure 1:
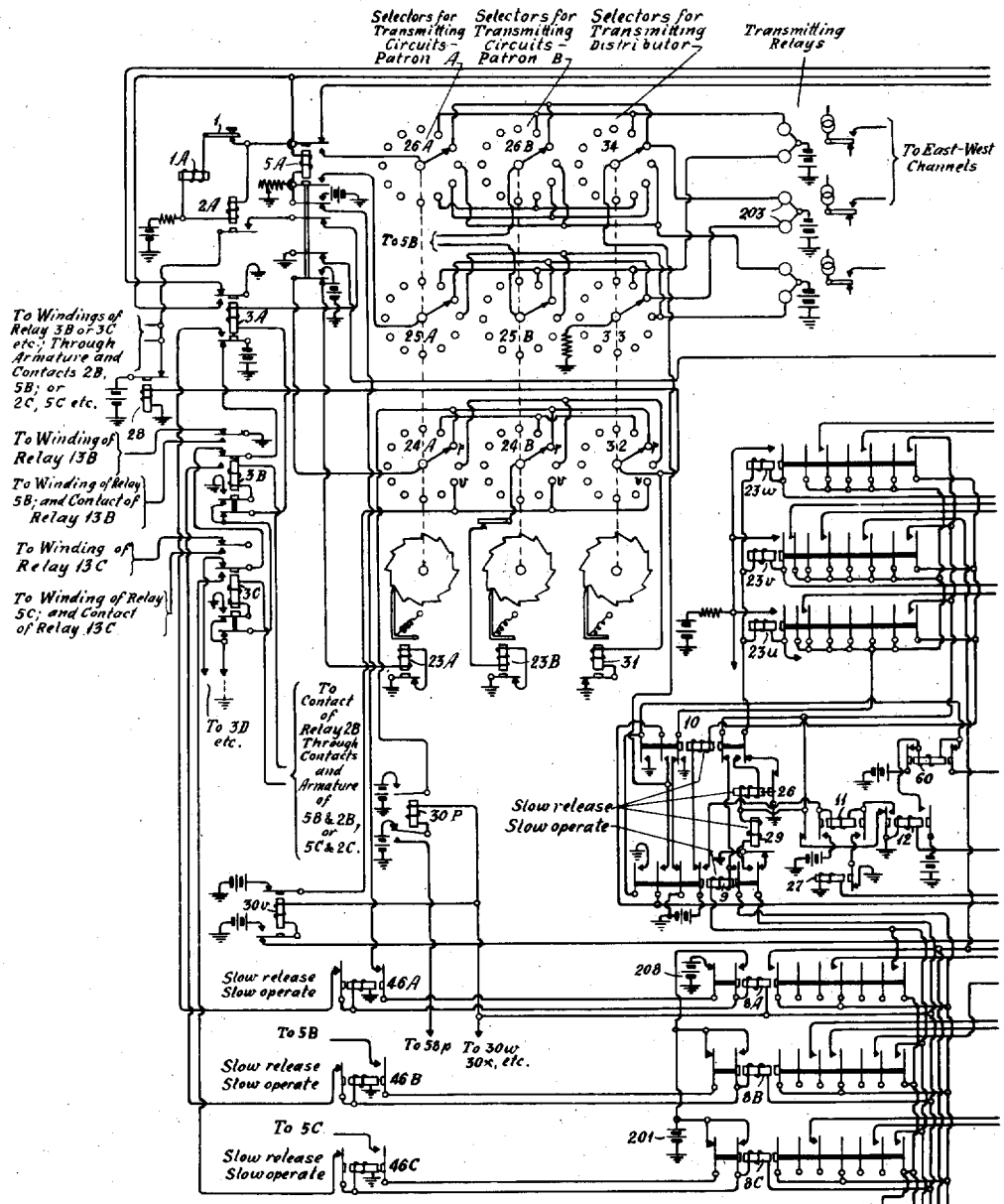

This invention relates to improvements in telegraph systems.

The primary object of the arrangements of the invention is to greatly increase the telegraph facilities between two points without increasing the number of channels existing between such stations.

A telegraph system to which the invention might be applicable would be one wherein a large number of circuits existed between two stations. These circuits might be furnishing "leased wire" service and ordinarily a pair of circuits, or one two-way circuit, for transmission in opposite directions might be set aside for each pair of distant subscribers. It is obvious that many of these circuits would be idle a great part of the time particularly if the service was of the half duplex type and there was a preponderance of transmission in one direction. It is the purpose of the arrangements of the invention to utilize these channels during their idle periods to furnish additional telegraph facilities to new subscribers.

In the arrangements of the invention a designated pair of circuits, or a single two-way circuit, will not be set aside for the sole use of a pair of distant subscribers. All of the channels existing between the two stations will be subjected to the control of selecting apparatus common to each terminal station whereby an idle line in either direction will be provided available to any subscriber as soon as he desires to send. With the selecting arrangements of the invention it will be possible to serve a greater number of subscribers than the number of existing circuits thus affording an increase in telegraph facilities without increase in existing channels. Further features and objects of the invention will appear more fully from the detailed description hereinafter given.

To further illustrate the general features of operation of the invention let it be assumed that there exists a telegraph system comprising a large number of channels interconnecting New York and Chicago and service over this system has been leased to pairs of subscribers in the distant cities. The arrangements of the invention are so designed that it will not be necessary to reserve two one-way channels for each of said half duplex service contracts. The arrangements of the invention will connect an existing idle one-way telegraph channel for transmission in the desired direction between the terminals of a half duplex service contract and will substitute an existing idle channel for transmission in the opposite direction whenever it is desired.

In a system interconnecting two points, such as New York and Chicago, and comprising a large number of channels, it is pointed out that at a certain time some of the channels might be busy transmitting from east to west, other channels might be busy transmitting from west to east and some of the channels might be idle. In accordance with the arrangements of the invention there would be connected at New York to a preselected one of the idle channels a code sending device with a corresponding code receiving device connected to said channel at Chicago. Also a second preselected idle channel will have a code sending device connected thereto at Chicago and a code receiving device connected thereto at New York. Assume that a patron at New York, who is receiving, now opens his key and sends a break signal. This will cause the code sending apparatus at New York to transmit over the first preselected idle channel the patron's code signal. The code receiving device at Chicago in response to the code signal from New York will cause selecting mechanism to connect to this first preselected idle circuit the patron's partner at Chicago. At the same time, the patron at New York would be connected to this first preselected idle channel for transmission from New York to Chicago. Selecting mechanism at Chicago also operates to pick out at Chicago a third idle channel and will connect thereto the local code receiving apparatus which was previously connected to the first mentioned idle channel. Code sending apparatus at Chicago now operates over the previously mentioned second idle channel in the direction from Chicago to New York to send thereover the code signal for the third selected idle channel. This code signal will operate the code receiving device at New York and cause selecting apparatus thereat to connect the code sending apparatus at New York, which was previouly connected to the first mentioned idle channel, to the third selected idle channel, so that said third selected idle channel will be in readiness to be connected to the next New York patron to send a break signal. A similar cycle of operations will take place should the break signal originate in Chicago.

Figure 2:
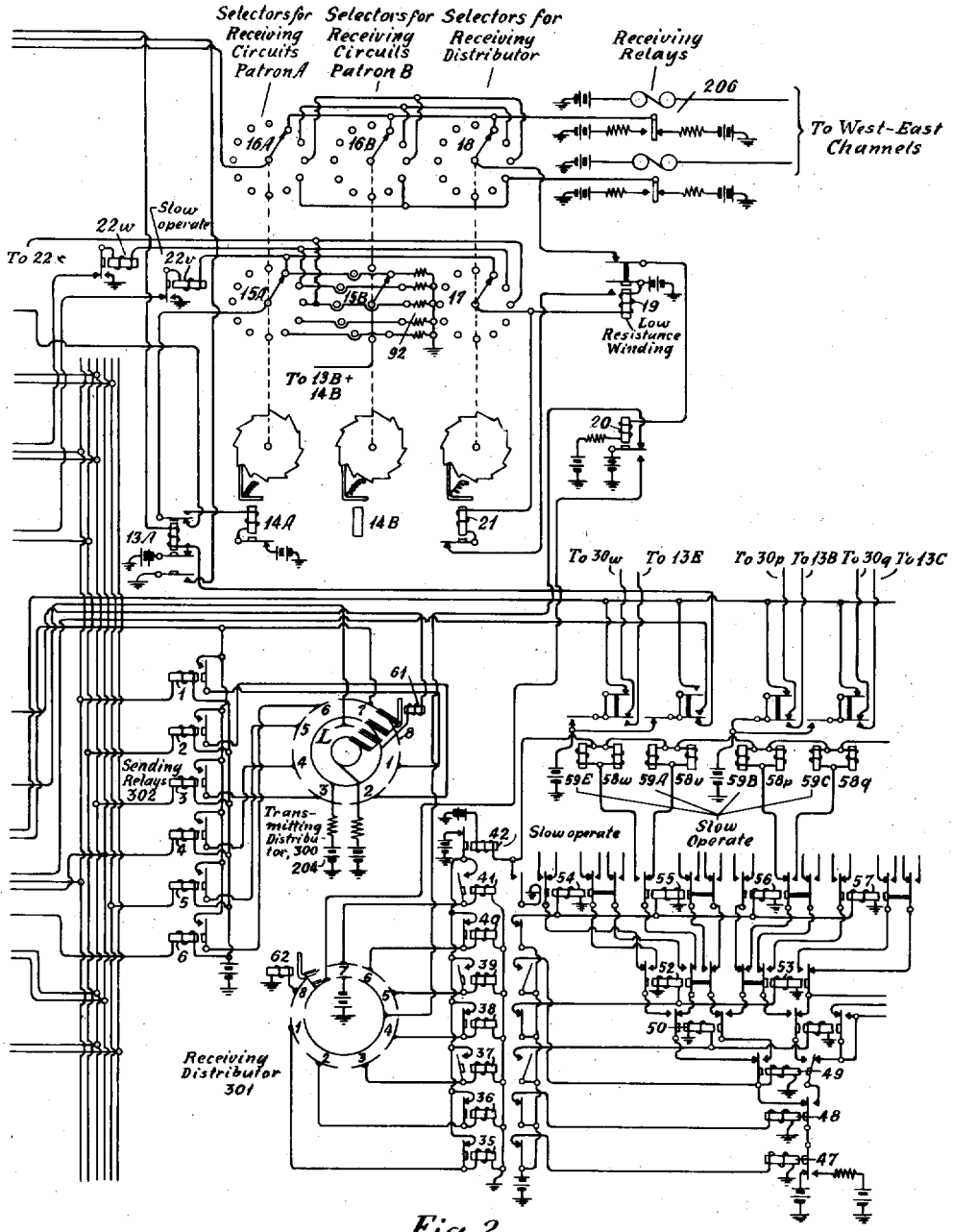

The invention may be more fully understood from the following description together with the accompanying drawings in the Figures 1 and 2 of which when taken together is shown a circuit diagram embodying the invention.

In Figs. 1 and 2 of the drawings with Fig. 2 at the right of Fig. 1 is shown a circuit diagram of the equipment to be found at one of the terminals of the telegraph system. Similar equipment would be provided at the other end of the group of circuits involved. In the drawing, capital letters refer to the portions of the selecting system of the invention which are associated with the circuits of individual patrons, and small letters denote equipment which is associated with a particular telegraph channel.

In the drawings is shown the code sending apparatus, the code receiving apparatus, and selecting mechanism at one end of a group of channels in the system, such as at the east or New York end. The code sending apparatus comprises a transmitting distributor 300 and the sending relays 302. Various code combinations designating different patrons may be set up on these relays over the contacts of a series of relays, such as $8^A$, $8^B$, $8^C$, etc. These latter relays are controlled by each individual patron's key. There will also be provided a series of transmitting selector switches such as $26^A$, $25^A$, and $24^A$ for patron A, a series of transmitting selector switches such as $26^B$, $25^B$ and $24^B$ for patron B, and other selector switches for each other patron. A series of selector switches such as 34, 33, and 32 will be provided for the code sender apparatus. The code receiving apparatus comprises a receiving distributor 301 and a plurality of relay arrangements associated therewith to be described in more detail hereinafter. A series of receiving selector switches such as $16^A$, and $15^A$ will be provided for patron A, with similar arrangements for other patrons. A series of selector switches such as 18 and 17 will be provided for the receiving distributor. A series of transmitting relays are shown connected to east-west channels and a series of receiving relays are shown connected to west-east channels.

The invention will now be described in a general way as an elaboration of the above before it is described in detail.

Résumé of Operation

Attention is called to the fact that in the system of the invention herein, the station of any patron, such as A in New York, will normally be connected to the station of a particular patron, such as A′ in Chicago, over some single telegraph channel in which transmission is possible in one direction only. Means are provided to switch patron A in New York or any other patron in New York or Chicago to any station assigned at the other city. This assigned patron in the other city is then the designated patron. Thereafter patron A and patron A′ are always connected for communication. It is emphasized that each station in one area will always be connected to its one definitely assigned corresponding station in the distant area.

The switching facilities which are provided herein are arranged so that any corresponding pair of patrons, who are always interconnected by a single channel over which transmission is possible in a single direction only, may switch to another channel for transmission in the opposite direction between the same pair of patrons.

In order to permit any of the New York patrons for example, who may be receiving at any one time from Chicago, to reverse the direction of transmission so that the New York patron may send to his Chicago partner, means are provided so that the New York patron may automatically disconnect his station facilities from the channel over which he has been receiving from Chicago and be automatically reconnected to a spare channel arranged for transmission in the opposite direction. To make this possible a single spare channel arranged for transmission in the direction from New York to Chicago is always in condition to be allocated to any New York patron who may wish to transmit in the opposite direction. This spare channel will in fact be appropriated by the first New York patron who breaks transmission from the distant city.

This spare east to west channel has been preselected, in a manner to be described below, so that the delay involved after a New York receiving patron breaks, before a channel in the reverse direction is made available will be kept to a minimum. This spare channel, when it is appropriated by a particular New York patron, say patron A, who has been receiving, is first conditioned, in response to the opening of a key by patron A in New York, to transmit the code of the patron A′ to Chicago. Since A is always to be connected to A′ when transmission is thus reversed, the code which is transmitted over the spare New York to Chicago channel available for A when A breaks, is always the same, namely, the code which conditions the channel for connection at Chicago to patron A′. A code transmitting device is always connected to the spare New York to Chicago channel at the New York central terminal. A code receiving device is always connected to the spare New York to Chicago channel at the Chicago central terminal.

The code transmitter is a single transmitting distributor and a group of six code relays associated with the distributor. The code transmitter is controlled by a different device for each New York patron. This device is a multicontact relay individual to each New York patron. Each multicontact relay is so wired that it conditions the group of six code relays and the transmitting distributor to transmit the code of each individual New York patron's partner in Chicago. In response to the opening of a key at the local station to which patron A in New York is connected, the multicontact relay associated with patron A's station will condition the code transmitter to transmit the code of patron A′ in Chicago over the spare east to west channel. If patron B in New York were to break by opening his key, the multicontact relay associated with the station of patron B would condition the code transmitting device to impress a train of code signals on the spare channel designating patron B′ at Chicago and similarly for each of the other New York patrons.

Immediately after signals comprising the code of the New York patron's partner in Chicago have been impressed on the New York terminal of the spare New York to Chicago channel, the channel over which the New York patron has been receiving from his Chicago partner is released at the New York terminal and the New York patron will be connected to the spare east to west channel over which the train of signals designating his Chicago partner has just been transmitted.

The New York end of the spare east to west channel is thus appropriated by the New York patron. The manner in which the desired Chicago partner is connected to the distant end of the channel will now be described.

When a channel is serving as a spare channel for transmission in the direction from New York to Chicago, it has been described that it is available to every subscriber who is at the time receiving at the New York terminal and that it is allocated to the first patron who breaks. A train of signals is first transmitted over the spare east to west channel immediately after the New York patron breaks to designate his Chicago partner, and immediately after performing this function the channel is connected to the particular New York patron who has broken. At the Chicago terminal it is necessary to receive these code signals and to connect the Chicago partner to the New York patron.

In order to do this a common code receiving and line selecting device is always connected to the incoming end of a channel when it is serving as a spare channel. For the purpose of this general description, by "spare channel" is meant the particular spare channel which is selected for use next in a given direction. The code receiving and line selecting device comprises a receiving distributor and a group of relays. This code receiving device, in response to the reception of a train of code signals, operates a specific relay individual to the Chicago partner of the New York patron.

Just as the transmitting end of the spare east to west channel was arranged so that it might be connected to the New York patron who first broke without any delay, so the incoming end of the spare east to west channel at Chicago is arranged so that it may be connected to the desired Chicago partner without delay. At the Chicago terminal the brushes of the individual receiving selectors of all partners whose stations are in the transmitting condition are stopped on the particular bank terminals to which the incoming end of the spare east to west channel is multipled. When the code receiving device registers the code designating a particular patron, who is at the time connected to a transmitting channel and whose direction of transmission is to be reversed, the brush of his individual receiving selector is conditioned so that it cannot be rotated and so that it will remain connected to the incoming end of the spare channel and a transfer relay is operated to switch the station line from the transmitting to the receiving condition. Thereafter, as will be described in more detail later, the brushes of the individual receiving selectors of all of the other patrons at Chicago, who are continuing to transmit, will be rotated so as to be in condition to be connected to the incoming end of a new spare channel. This new spare incoming channel will be in readiness for the first patron to be broken of those who continue to transmit.

In the system of the invention any pair of patrons A and A′, B and B′, C and C′, etc., at any one instant may be transmitting either from New York to Chicago or from Chicago to New York, and any receiving patron must be able to reverse direction and transmit without an appreciable delay, hence a spare channel is provided in the Chicago to New York direction also.

A code transmitting device identical with that connected to the New York terminal of the New York to Chicago spare channel is connected to the Chicago terminal of the Chicago to New York spare channel. Code receiving equipment identical with that connected at Chicago to the New York-Chicago spare channel is connected at New York to the Chicago-New York spare channel.

The operation of the Chicago to New York spare channel is identical with that of the spare channel in the opposite direction. When a Chicago patron who has been receiving from New York wishes to transmit to New York, he opens his break key. This connects his particular multicontact relay to the code transmitting apparatus at Chicago. The common code transmitter at Chicago which serves all of the Chicago to New York channels is conditioned by the multicontact relay of the Chicago patron who is breaking, to transmit the particular code of his New York partner over the spare Chicago to New York channel. Then the Chicago patron is connected to the spare Chicago to New York channel. At the incoming end of the channel in New York the code receiving apparatus connected to the spare west to east channel translates the incoming code signals and selects the partner in New York of the patron who is breaking at Chicago.

A spare channel is thus available in each direction and a code transmitter is connected to the outgoing spare channel and a code receiver is connected to the incoming spare channel at each city.

When a spare channel has been appropriated by a particular patron and his partner, for transmission in a particular direction, let us say from New York to Chicago, under this invention, another spare channel is prepared for transmission in the same direction, so as to be available to the next New York patron who breaks transmission from Chicago, so that he may transmit to his partner in that city without delay. In order to condition a channel so that it will serve for such a purpose, it is necessary to first find a channel that is not busy and thereafter to connect a code receiver to it at Chicago and a code transmitter to it at New York. Since there is only one code receiver in Chicago and one code transmitter in New York, these devices are connected to the new spare New York to Chicago channel. The manner in which the new spare New York to Chicago channel is prepared to serve the next New York patron who may break will now be described in a general way.

After the code receiving and selecting apparatus at Chicago has performed its function of receiving the code of patron A′ and connecting A′ to A through the first New York to Chicago spare channel, a channel selector switch associated with the Chicago code receiving apparatus, and to which channel selector all incoming channels are connected, is rotated until it is connected to a new spare incoming channel. The code receiving apparatus at Chicago is immediately connected to the incoming end of this new spare channel. There now remains the problem of connecting the code transmitting equipment to the New York terminal of this same new channel. The manner of doing this will now be described in general.

The incoming or receiving end of each channel in each city has an individual device associated with it which identifies it. This device is a multicontact relay, similar to the multicontact relay associated with each patron's station. The multicontact relay associated with each patron's station is wired, as we have seen, in such manner that when a particular subscriber broke and his individual multicontact relay was connected to the common code transmitter, the code transmitter was conditioned to transmit the code of the patron's partner over the spare channel. The multicontact relay connected to the incoming end of each channel, however, is so wired that it will, if connected to a code transmitter at that station, condition the code transmitter to transmit the code of the channel which has been selected, and to which the receiving code device has already been connected.

After the idle incoming channel has been found, therefore, the individual multicontact relay associated with its incoming end is connected to the common code transmitting device at the same terminal, in this case Chicago. The common code transmitting device, comprising the transmitting distributor and the bank of code relays, described above as transmitting a subscriber's code, is conditioned by means of the multicontact relay associated with the incoming end of the channel, which has been selected, so that it will now transmit the code of the selected channel. This code is transmitted over the spare Chicago to New York channel also described above. It is received at the New York terminal by the code receiving device connected to this channel. In response to the train of signals designating the trunk which has been selected and to which the Chicago code receiving mechanism has already been connected, the New York code receiving mechanism connected to the spare Chicago to New York channel will connect the common code transmitting device to the outgoing end of the new spare New York to Chicago channel in New York.

Attention is especially called to the fact that after the incoming or receiving end of a new spare east to west channel has been found in Chicago, and the incoming end of this channel has been connected to the common code receiving and selecting device at Chicago, the individual multicontact relay associated with the incoming end of that particular channel operates to condition the common code transmitting device at Chicago to transmit to New York the code identifying the new spare channel. The train of signals comprising this code is not impressed on the new spare east to west channel itself. A code receiving and selecting device only is connected to the incoming end of the new spare east to west channel. There is only one common code transmitting device at Chicago. This is connected to the spare Chicago to New York channel. There is only one common code receiving and selecting device in New York. This is connected at New York to the New York end of the Chicago to New York spare channel. The Chicago to New York spare channel is therefore used to transmit the train of signals identifying the new spare east to west channel, the incoming or receiving end of which has been selected at Chicago. The individual multicontact relay associated with the incoming end of the particular east to west channel which has been selected sets up the code of the selected channel on the common code transmitter in Chicago. The common code transmitter impresses the code identifying the selected channel on the spare Chicago to New York channel. The common code receiving and selecting device in New York receives this code and operates to connect the common code transmitted at New York to the outgoing end of the New York to Chicago channel, the receiving end of which was first selected at Chicago, and to which the common code receiving and selecting device has already been connected at Chicago.

The brushes of each individual transmitting selector in New York, associated with patrons who are still receiving from Chicago, will all be connected in multiple to the bank terminals on which the outgoing end of the New York to Chicago spare channel appears. Each of the New York patrons who is still receiving from Chicago will therefore have equal access to the new spare New York to Chicago channel which will be appropriated by the next New York patron to break, in the same manner as described for A.

This sequence of operations may be better understood from reference to Fig. 1 and Fig. 2 of the drawings and these operations will now be described with reference to these figures, again in a general way, as a further elaboration of the above, before the circuits are described in detail.

General Features of Circuits and Apparatus

(a) *Receiving channels and receiving selector switches*

At the upper right of Fig. 2 two telegraph channels marked "West to East" are indicated connected to the windings of two receiving relays 206. These channels are two of a number of similar channels which we will assume are incoming from Chicago. The armatures connected to these relays, which are operated between positive and negative battery connected to their contacts, in response to incoming signals extend the incoming channels to the incoming channel selector 18 and the channels are then multipled to corresponding terminals on each New York patron's receiving selector bank such as 16B, 16A, etc. Each patron at New York has one receiving selector such as 16A or 16B. The incoming channels are all connected to individual terminals of the incoming channel selector switch bank 18, as shown, and then extend through each patron's receiving selector in multiple, as shown, so that each patron may have access to each incoming channel. The individual rotatable brush of each receiving selector of each New York patron extends any receiving channel to which it may be connected to the upper break contact of a relay such as 5A, Fig. 1. This relay is associated with station A. One such relay (no others are shown) is associated with each patron's circuit. From the top armature of relays such as 5A, the channel is extended to the individual patron's station. The transmitting key 1 and the receiving magnet 1A associated with patron A are located at patron A's local station.

At any one time each patron who is receiving will be connected to a different incoming channel. The selector brush of each individual receiving selector 16A, 16B, etc., of each patron who is so receiving will be in a different position relative each to the other, to engage bank terminals in different relative positions to provide each patron who is receiving with a different incoming channel.

The individual receiving selector bank brushes of each patron who is at the moment transmitting, however, will all be stopped at corresponding terminals on their receiving selector banks such as 16A, 16B, etc. Their brushes will, therefore, each be connected to the same channel. This may be considered to be the New York end of the Chicago to New York spare channel.

(b) *Code receiving and selecting device*

The code receiving and selecting device at a particular central terminal is connected through the brush of the code receiving selector 18 to the incoming or receiving end of the spare channel from the distant terminal. Thus selector brush 18 may be assumed to be connected at New York to the incoming Chicago to New York spare channel. From the brush of selector 18, a path may be traced through the top back contact and armature of relay 19 to the winding of relay 20. Relay 20 follows the incoming code signals. Depending on their character, these may identify either (1) a New York patron whose transmitting is being broken by his Chicago partner or (2) a spare New York to Chicago channel, the receiving end of which has been selected at Chicago, and to which the code transmitting device at New York is to be connected to complete the channel selecting operation. Relay 20 controls the receiving distributor 301 and the code registering relays 35 to 42. These latter relays in turn control the selecting relays 47 to 59. The selecting relays 47 to 59 are controlled in either one of two manners, depending upon whether the incoming code signals identify a New York patron who is to be broken, or a spare channel whose receiving end has been selected at Chicago and to the New York transmitting end of which the code transmitter is to be connected.

(c) *Transmitting channels and transmitting selector switches*

Attention is now directed to the east to west channels at the right-hand top of Fig. 1. Three transmitting relays controlling three east to west channels are indicated. It is to be understood that these may be three of a large group of transmitting channels. The top or transmitting conductor of each of these relays is shown first connected to individual terminals on the spare transmitting channel selector bank 34. Then each channel is extended in multiple to corresponding terminals on the different transmitting selector banks such as 26B, 26A, etc., which are also individual to each patron. The channels are extended through the individual rotatable brushes of the 26 series of transmitting selectors, and may be connected to the various patrons' stations through the top make contact of the patrons' individual relay such as 5A. If the relay such as 5A is in the position indicated in Fig. 1, the patron's local station is connected to a receiving channel. If the relay such as 5A is operated, the patron will be connected to a transmitting channel.

Each patron whose local station is in the transmitting condition will have his relay corresponding to relay 5A operated and the individual brushes of the patron's individual transmitting selectors will be in engagement in different positions, relative each to the other, with different transmitting channels. The brushes of all transmitting selectors of the 26 series of all patrons who are at the moment receiving, however, will be in the same position relative each to the other on its respective individual transmitting selector. Thus each patron whose local station is in the receiving position will have the brush of its individual transmitting selector of the 26 series connected to the same spare transmitting channel. This channel will be appropriated by the first receiving patron who breaks sending from the distant station.

In Fig. 1 station A is shown in the receiving condition. Its 5A relay is released so that the station is connected to its individual receiving selector. The brush of its individual transmitting selector 26A is shown connected to a channel controlled by relay 203 which at the moment is serving as the spare New York to Chicago channel. All other individual transmitting selector brushes associated with New York stations which are at the moment receiving will be connected through corresponding terminals on their associated transmitting selector banks to the same spare channel. It may be observed that transmitting selectors of only two patrons have been shown. Station A is receiving. Since the brush of the 26B selector is also stopped on the terminal connecting to the spare channel controlled by relay 203, station B is indicated as being also in the receiving condition. Since only two New York stations A and B are indicated, no selectors associated with New York stations in the transmitting condition are shown. Such transmitting stations would, of course, have their relays such as 5A operated. Each transmitting station would be connected through its respective individual bank terminals and individual transmitting selector brush to a different individual channel from those of other transmitting stations. The brushes corresponding to different stations will of course be in different positions.

The brush of the selector 34 is shown stopped on the terminal of its bank through which the spare New York to Chicago channel is multipled. This spare channel has been selected by selector 32, which selects the transmitting end of a spare channel, by simply preventing the further rotation of the toothed wheel associated with magnet 31 when the rotatable brush of selector 32 engages a terminal from which battery has been disconnected due to operation of the associated relay in the 30 series. The latter will have been operated upon the reception of the channel code sent from the distant station to identify the spare New York to Chicago channel as the last step in a previous cycle of operations.

(d) *Code transmitting and selecting device*

If a path is traced from the brush of bank 34 it may be seen to connect to the second make contact from the left-hand end of relays 10 and 9. When either of these relays is operated, the path extends into Fig. 2 to the make contacts of the six sending code relays 302. As different combinations of the armatures of the six sending code relays 302 are operated in accordance with a desired code, negative battery 204 is connected in turn, as the transmitting distributor 300 is rotated, through the armatures of sending relays 302 to the spare channel. The six sending relays 302 and the transmitting distributor 300 constitute the code sending mechanism at the east or, as we have assumed, New York terminal. The code sending mechanism is shown ready to be connected, as soon as relay 9 or 10 is operated, to the spare east-west or New York to Chicago channel, through the brush of spare channel selector bank 34.

(e) *First receiving station to break at eastern terminal seizes spare east-west channel*

As has been pointed out, the brush of each receiving patron's individual transmitting selector bank at the east or New York terminal is connected to the same spare channel. This spare east to west channel will be exclusively connected to the local station of the east patron who first breaks, in a manner to be described, when the station's individual relay in the 5 series is operated, shortly after the patron initiates the breaking operation by opening the station transmitting key such as 1.

(f) *Seized east-west channel used to send code to identify western partner and connect his set to seized channel*

Before the channel is connected to the station of the first east patron to break, as has been pointed out, the spare east to west channel is used to conduct a train of impulses identifying the western partner of the first eastern patron to break. To do this, as has also been pointed out, a separate multicontact relay, such as 8A, 8B, 8C, etc., is under the control of each patron's station.

When a receiving patron at the east station breaks, in a manner to be described, the corresponding relay in the 8 series is operated. Each relay in the 8 series has its right-hand group of contacts wired in a different manner, to operate a different combination of the 302 sending relays, so as to transmit a series of signals over the spare east to west channel. These signals will control the code receiving and selecting device at the west terminal to connect the partner of the eastern patron to the spare channel at the distant western station.

After the Chicago patron's signal code has been transmitted from New York, the relay in the 5 series at the New York station, corresponding to the New York partner who has broken, will be operated to connect the station to the spare east to west channel.

*(g) Selecting new spare east-west channel for eastern receiving patrons*

It was stated that the brush of each and every receiving patron's individual transmitting selector such as 26A, 26B is resting upon corresponding terminals, and to all of these terminals the spare east-west channel is connected. After the spare east to west channel has been taken up by the first east patron to break, it is necessary to provide a new spare east-west channel, and connect the brushes of the individual transmitting selectors of all of those eastern patrons who are continuing to receive to this new spare trunk.

*(h) New spare east-west channel initially selected at west terminal*

It has been pointed out that the selection of the new spare east to west channel is first made at the western terminal, after which the code of the new spare east-west channel is transmitted over the spare west to east channel, and the transmitting selectors of eastern receiving stations are then connected to the new east to west channel. But before this is done all of the brushes of the transmitting selectors at the east terminal, associated with patrons who are continuing to receive, are stepped off the terminals of the first spare east to west channel, which we have assumed has been taken up by A, and are rotated until the new spare channel identifying code is received at the eastern terminal, when they are all stopped at the corresponding terminals of their respective selectors to which the designated new east to west spare channel is connected.

We will presently describe the operations at the western terminal in a general way, showing how the Chicago partner who is broken is connected to the incoming end of the first spare channel, how the incoming or receiving end of a new spare east to west channel is selected at the western central terminal, and how its code is transmitted to New York over the spare west to east channel. First, however, the manner in which the New York transmitting selectors, associated with patrons' stations which continue to receive, are stepped off the terminals of the first spare transmitting channel and are rotated until the code of the new east to west channel is received, will be described in a general way.

*(i) Eastern patrons still receiving are shifted to newly-selected spare east-west channel*

The brushes of the transmitting selectors are each under control of magnets such as 23A, 23B, etc., and 31. When these magnets are energized, their armatures are operated and turn the toothed wheels associated with the armatures. The brushes associated with selector banks such as 24A, 25A and 26A are rigidly fixed to the shaft on which the toothed wheels are mounted and rotate in unison with their respective wheels. The shafts are indicated by the dotted lines extending upwardly through the center of the banks. Each selector magnet, therefore, operates three brushes so as to step them into engagement with successive terminals on their associated terminal bank. The brushes of each multibank selector, as it is known, are arranged in alignment on their shaft to engage individual terminals in corresponding positions on their associated banks simultaneously.

If the path for selector magnet 23A is traced, it may be followed from ground through the armature, back contacts and winding of selector magnet 23A, through the bottom back contact and armature of relay 5A (when relay 5A is released as shown for the receiving condition), through the brush of selector 24A and terminal *p* of bank 24A to parallel branches. The first branch extends in multiple to all contacts corresponding to *p* on all other transmitting selectors associated with other patrons, and also to the *p* terminal of selector bank 32, the function of which will be explained later. The second branch extends to the top armature of relay 30P. If relay 30P is released, battery is connected to the circuit just traced through the back contact associated with the top armature of relay 30P. If relay 30P is released and relay 5A is also released, the brush of selector 24A (which stands on its associated *p* terminal), will be moved off the *p* terminal to the succeeding terminal. All brushes controlled by selector magnet 23A, namely the brushes associated with banks 24A, 25A and 26A will, of course, be moved simultaneously.

If the path of the first branch circuit mentioned above, which is connected to all other *p* terminals on the other selectors is traced, it may be observed that circuits extend from each *p* terminal through a similar brush arm. An armature and a back contact is shown in series with the brush arm of selector 24B. This is intended to represent the bottom armature and back contact of relay 5B, which relay is not otherwise shown. This armature and back contact correspond to the bottom armature and back contact of relay 5A through which the path was traced for the operation of selector magnet 23A. Station B, we have seen, is in the receiving condition. Its relay 5B is released just as is 5A. Every eastern station which is in the receiving condition will have its associated relay in the 5 series, such as 5A, 5B, etc., released. A path will be provided through every relay so released, which extends through the magnet of the transmitting selector associated individually with said station in the receiving condition, to operate the magnet of its associated transmitting selector and step it off its *p* contact.

In the case of any station which is in the transmitting condition, the associated relay in the 5 series, as we have seen, is operated. Since the path through the associated selector magnet is broken at the associated 5 relay of a patron whose station is in the transmitting condition, the release of the relay in the 30 series associated with the channel to which the station is connected will not move the patron's associated selector. But the release of relay 30P will move the brushes of the individual transmitting selectors of all patrons whose stations are in the receiving condition off bank terminals *p* if the selector brushes are resting on terminals *p*.

*(j) Indentification at eastern terminal of new spare east-west channel previously selected at western terminal.*

There is a relay such as 30P associated with each receiving channel at the eastern office. It is controlled in response to a code transmitted from the western office when the western receiving or incoming end of a channel such as *p* is selected at the western office. The manner in which this is performed will be explained below. At this time it is necessary to note that when the code receiving mechanism at the New York central terminal receives the code of the new spare New York to Chicago channel over the Chicago to New York spare channel (which occurs after the receiving end of a new spare channel has been selected at the western terminal), the selecting relays associated with the code receiving apparatus at the eastern terminal are conditioned to control a particular relay in the 30 series depending upon the trunk which has been selected.

When a trunk is selected to function as a spare east-west channel, its particular relay in the 30 series is operated. This disconnects battery from the path heretofore traced through the top armature and contact of that particular relay in the 30 series and thus removes battery from its corresponding terminals on the selector banks of the 24 series of selectors and selector 32. If the 24 series of selectors and selector 32 are stepped so as to engage a row of terminals from which battery has been disconnected, they will stop on these terminals, because upon reaching them their rotating selector magnets will be deenergized.

It has been shown that if any patron's station is in the transmitting condition, its associated relay in the 5 series will be operated and as the path through its associated transmitting selector of the 24 series is therefore broken, the selector magnet will not be operated and its brush will remain connected to its individual transmitting channel, while all of the brushes associated with stations in the receiving condition are rotated.

As only one spare channel is provided in any one direction at any one time, only one relay in the 30 series at a particular central terminal is ever operated at any one time. All other relays in the 30 series are released, and when so released are each connecting battery at all times to a particular row of terminals on the selectors of the 24 series and selector 32. It will be shown in the detailed description of the operation of the circuit below, that the relay in the 30 series associated with a particular channel is released when the channel has been appropriated as a spare by a particular patron of the group which is connected to it at any one time while in the receiving condition. This impresses battery on the row of contacts of transmitting selectors associated with the channel and moves all selectors associated with receiving stations at the eastern terminal except the one associated with the patron who has taken the channel, to the next row of contacts. Since battery is connected to each contact on all of the banks of the 24 series and the 32 bank at this time, all selectors associated with patrons whose stations are receiving will be operated as each successive terminal is engaged by the brush associated with each of the banks. Such selectors will continue to rotate until they engage a particular row of contacts from which battery has been removed through the operation of a particular relay in the 30 series, following the selection at the western terminal of the channel with which the particular 30 relay is associated.

*(k) Receiving selector of breaking station at east terminal switched to spare west-east channel with which other transmitting stations at east terminal are already associated*

There is one other important station apparatus switching operation incidental to a breaking operation by a patron, let us say patron A in New York, who has been receiving. Attention was called to the fact that when any patron is receiving, his individual receiving selector, say 16A, is connected to an individual channel incoming from Chicago. The brush of his receiving selector switch will be displaced relative to the positions of the brushes of all other receiving stations at that terminal. The receiving selector brushes of all patrons who are receiving will be in different relative positions to connect to different incoming channels from Chicago individually. On the other hand the group of patrons who are transmitting to Chicago will have the brushes of their individual receiving selectors all stopped in the same relative positions on their respective banks to connect to the incoming end of the spare Chicago to New York channel, so that each transmitting patron will have equal access to the spare incoming trunk if his transmitting is broken. When, therefore, a receiving patron in New York breaks, the brush of his individual receiving selector through which he has been receiving from Chicago no longer is left connected to the old incoming channel to which it has been hitherto connected. This individual receiving selector is operated alone, while the others remain in position, until its brush is connected to the incoming end of the spare Chicago to New York channel to which the brushes of all other receiving selectors of patrons who are at the time transmitting are already connected.

Thus, if patron A's station in New York has been receiving over a channel through a particular terminal on bank 16A to which it has been connected individually, all of the New York patrons who are at the time transmitting will have had their receiving selectors connected in multiple, while A has been receiving, to the incoming end of the spare Chicago to New York channel. When patron A in New York breaks, his individual receiving selector is rotated alone until it, too, is connected to the same spare channel to which the receiving selectors of all New York patrons who are at the time transmitting are already connected in multiple. In this manner provision is made so that the individual receiving selector of A in New York is connected, immediately upon breaking, to the incoming end of the spare Chicago to New York channel, so that A has access to this spare channel on the same basis as all New York stations which are in the transmitting condition. The spare channel may be assigned to A if A is the first New York patron to be subsequently broken.

(l) *Station receiving break at west terminal, exclusively connected to spare east-west channel, to which code receiving and line selecting apparatus of west terminal is already connected*

Attention is now directed to the west or Chicago terminal. It is to be understood that the equipment at both terminals is identical. At Chicago, as at New York, there is one set of equipment per Fig. 1 and Fig. 2 combined. Fig. 1 and Fig. 2 will be used to describe the operations at Chicago also. The symbol for prime will be added to apparatus assumed to be in Chicago in the general description of the operation of the apparatus at the Chicago terminal to follow.

The train of incoming signals comprising the code of patron A′ arriving in Chicago over the spare New York to Chicago channel as a result of the initiation of a breaking operation by A in New York is impressed on a particular west to east receiving relay of the 206′ group, namely the 206′ receiving relay connected with the channel which is then serving as the New York to Chicago spare channel. It has been assumed that channel *p* was serving as the spare. The receiving or incoming end of this channel in Chicago is connected to a particular terminal on selector bank 18′ and is multipled to corresponding terminals on each of the individual selectors associated with each Chicago patron such as 16B′, 16A′, etc. Each Chicago station which is at the time transmitting has its individual receiving selector brush stopped on terminal *p′*. The first station which is broken is to be exclusively connected to channel *p*, through its particular selector, which is already connected to channel *p*. The code receiving and line selecting apparatus at the Chicago station is also connected to channel *p*. This connection was made in a previous cycle of operations, similar to the one which is being described, when trunk *p* was selected as the spare New York to Chicago channel.

(m) *Operation of code receiver at west terminal to connect western partner to spare east-west channel on receiving west partner's code*

Relay 20′ will be operated and released in accordance with the incoming signal train, which is to connect patron A′ exclusively to channel *p*. Relay 20′ in turn will release receiving distributor 301′ and permit it to rotate, under the influence of a driving motor, in a well-known manner. The train of code signals designating patron A′ will operate certain of the relays in the group of code registering relays 35′ to 42′, in accordance with the code of patron A′. The selecting relays 47′ to 59′ will be operated in a certain manner depending on the particular code which is registered on relays 35′ to 42′.

As has been mentioned heretofore, relays 47 to 59 at each central terminal are arranged so that they may make a selection of a patron's station or of a channel. Each patron associated with each central terminal has a separate conductor extending from the terminal apparatus associated with his local station into this group of relays. Furthermore, each channel has an individual conductor extending into the group of relays 47 to 59. When the group of relays is operated in response to a patron's code, some individual conductor connecting to apparatus individual to a patron's station is selected by the group. When the group of relays is operated in response to the code of a particular channel, the conductor connected with that particular channel is selected. In this case the bank of relays 47′ to 59′ responds to the registering of the code of patron A′ by selecting the conductor connecting to the terminal apparatus individual to patron A′.

(n) *Receiving selectors of all transmitting stations at west terminal except that one receiving break shifted to a new spare east-west channel*

In response to the selection of the individual conductor associated with station A′, relay 13A′ will be operated, in turn releasing relay 5A′ to connect patron A′ in Chicago to the incoming or receiving end of what was formerly the New York to Chicago spare channel, which has now been allocated to patrons A and A′. Since the individual receiving selector brushes of all stations in Chicago which are in the transmitting condition are, at the moment, all connected in parallel to the same channel to which A′ has just been connected through the operation of his relay 5A′, the selector brushes of the receiving selectors of all such stations at Chicago are now rotated simultaneously, to step them off terminals *p′* through which all have been heretofore connected to channel *p*. The magnet of the receiving selector 14A′ associated with patron A′ is conditioned, by the operation of relay 13A′, so that the selector cannot be rotated and consequently the brush associated with the receiving selector of patron A′ alone remains connected to channel *p*.

(o) *West patron's transmitting selector shifted from west-east channel over which he had been signaling, to spare west-east channel common to selectors of other receiving patrons*

Attention is now directed to the transmitting selector associated with station A′ in Chicago. As soon as the relay 5A′ in Chicago is released, to transfer patron A′ from the transmitting to the receiving condition, his 23A′ selecting magnet is operated individually. The circuit is from battery on the top contact of the relay in the 30′ series associated with the west-east channel over which he was transmitting, (this relay was released in the previous cycle by which the west-east channel was appropriated by patron A′), thence through the terminal on bank 24A′ associated with that channel, through the brush of switch 24A′, through the bottom armature and back contact of relay 5A′, and through the winding, armature and contact of selector 23A′ to ground. This steps the brush of the transmitting selector of patron A′ off the terminal associated with the channel over which he was transmitting to patron A in New York. Since only one spare channel from Chicago to New York is provided, every relay in the 30′ series in Chicago will be in released condition except the one associated with the spare Chicago-New York channel. The transmitting selector magnet 23A′ of patron A′ will continue to operate as the brush of 24A′ is stepped, until it finds a terminal to which there is no battery connected, whereupon the selector magnet 23A′ is deenergized. Thus the transmitting selector of station A′ in Chicago is rotated individually so as to connect to the spare Chicago to New York channel. The brushes of the transmitting selectors of all other Chicago stations which are in the receiving condition and the Chicago code transmitting apparatus are of course already connected to this channel.

(p) *Selection of new spare east-west channel for receiving selectors of all west stations still transmitting east*

The next step in the cycle of operations is the finding of the incoming or receiving end of a new spare channel for all of the receiving selector brushes associated with Chicago stations which still remain in the transmitting condition, after patron A' has been broken and connected to channel *p*. Attention is particularly called to the fact that at this time, as described above, the brushes of the individual transmitting selectors of all patrons in New York who are receiving from Chicago are continuing to rotate, awaiting the selection at Chicago of the receiving end of the new spare channel, to the transmitting end of which they are ultimately all to be connected in parallel at New York.

The manner in which the selection of the receiving end of the new spare Chicago to New York channel is made at Chicago will now be described in a general way.

When relay 5A' was released, direct ground was connected from its second armature from the bottom, through the top front contact and armature of relay 13A', which was operated when patron A' was selected, through the brush of selector switch 15A', to the *p'* contact of switch 15A' and then to all of the *p'* contacts on all of the 15' switches and switch 17' in parallel. It is to be understood that at this time the brushes of all 15' selectors of all Chicago stations in the transmitting condition are resting on contact *p'*. Further, as has been described, the brush of selector 17', which connects to the Chicago code receiving and selecting apparatus, is resting on the same terminal. When relay 13A' operated, its selecting magnet 14A' was disconnected from its associated selector brush 15A' so that the A' receiving selector cannot be operated. If any other relay in the 13 series, such as 13B' or 13C' etc., not shown, had been operated instead of 13A', the individual associated selecting magnet in the 14' series would have been disconnected so that its selector, instead, could not be operated. From the *p'* contacts of each 15' switch, other than 15A', the circuit extends through the individual 15' selector brushes of all stations which continue to transmit, through the top armatures and back contacts of 13' series relays, which are released, and through the windings and contacts of 14' series magnets to battery.

In the case of selector switch 17', the path from ground above traced to contact *p'*, extends through the brush of selector 17' to parallel branches. The first branch extends through the winding of low resistance relay 19' to battery, operating relay 19'. The second branch extends through the winding and contacts of selector magnet 21' to the top inner front contact of relay 19'. When relay 19' is operated, the path is completed through the top inner front contact of relay 19' to battery. Thus magnet 21' and all 14' type receiving selector magnets associated with Chicago stations which continue to transmit are operated to move the brushes of selector 17' and of the 15' series selectors off the *p'* contacts. The 18' series and 18' brushes are correspondingly moved. The selector magnet and the corresponding brush of the 15' and 16' series selector of the patron who has been selected will remain idle so that the selected Chicago patron will remain connected to the *p* channel.

Each receiving channel that is in use will be connected to some Chicago patron through a relay in the 5' series which will be released. The corresponding 5' relay will be supplying direct ground over its second contact from the bottom, over the upper front contact of the corresponding 13' series relay and 15' series brush to a row of contacts on the 15' series and the 17' selectors. If the 15' series and 17' brushes associated with stations which are continuing to transmit are stepped onto terminals associated with busy channels, they will encounter ground and will be stepped off and will continue to rotate until a row of terminals corresponding to an idle channel is found on the 15' series and 17' selectors. When the brushes of the 18' and 16' series selectors are connected to an idle channel, there will be no direct ground connected to the corresponding terminals on the 15' series and 17' selectors since there is no released 5' relay associated with the channel. There will be, however, an indirect ground connected to such a terminal through one of the 92' resistances. One 92' resistance is connected to each terminal on the 15' series selector banks in parallel, as shown. When brush 17' is connected to a terminal on which there is no direct ground but from which the path to ground must extend only through the 92' resistance connected to the terminal, the current through the 19' relay is reduced so that relay 19' releases. This breaks the path through the winding of selector magnet 21' which also releases. The release of relay 19' also connects the winding of relay 20' which controls the code receiving apparatus to the incoming or receiving end of the newly selected spare channel at Chicago. In the case of the selector magnets of the 14 series, when their associated brushes are connected to a row of terminals on which there is no direct ground, the magnets are not operated and the brushes of the 15' and 16' selectors associated with stations still transmitting stop on rows of terminals corresponding to the receiving end of the new found channel.

(q) *Code designating east-west channel newly selected as spare at west terminal sent to east terminal over spare west-east channel*

The receiving end of a new spare channel has now been selected at Chicago and the code receiving apparatus and the brushes of the receiving selectors of the stations which are continuing to transmit at Chicago have been connected to the new spare channel. It is now necessary to condition the common code transmitting apparatus at Chicago to transmit the code designating the newly selected spare channel, (the receiving end of which has now been selected at Chicago), to New York over the Chicago to New Cork spare channel. This will cause the code receiving apparatus connected to the New York end of this Chicago to New York spare channel to make a channel selection, which will stop the transmitting selector brushes of the New York stations that are continuing to transmit, as well as the common code transmitting equipment, on the row of transmitting terminals in New York corresponding to this channel.

Each of the terminals of the selector banks such as 17' at each central station corresponds with the receiving end of a different channel.

When the brush of selector 18' is connected to a particular terminal, as has been explained, the brush of selector 17' stands on a corresponding terminal in the same relative position. In order to identify each of the channels to which the brush of selector 18' may be connected, a separate identifying device is connected to each of the corresponding terminals of selector 17'. It is assumed that the channel which was found to be idle was the *v* channel. When the brush of selector 17' is connected to its *v* terminal, a circuit may be traced from battery through the winding of relay 19' through the brush and terminal *v'* of selector 17', through the winding of relay 22v', into Fig. 1, through the windings of relay 23v', through the right-hand outer armature and contact of relay 10' and the contact and armature of relay 26' to ground. Relay 23v' operates and locks. Relay 23v' is the identifying device associated with the *v* channel. There is a relay in the 23' series associated with the receiving end of each channel in Chicago. The group of right-hand contacts of each of these relays is wired in a different manner, corresponding to the code of the particular channel. When channel *v* is selected and relay 23v' is operated, the code of the *v* channel is set up. If some other channel is selected, say the *w* channel, relay 23w' would be operated which would set up the code of channel *w*.

The code of channel *v* must now be transmitted to New York. This is done by means of the spare Chicago to New York channel. The common code transmitting device in Chicago, together with the brushes of the transmitting selectors associated with the Chicago stations which are at the time receiving, are connected in multiple to the spare Chicago to New York channel, which is to be assigned to the next Chicago patron who breaks sending from New York. This spare channel is now used to transmit the code of the new New York to Chicago channel, channel *v*, the receiving end of which has now been selected at Chicago.

Relay 23v' sets up its particular code on sending relays 302', and transmitting distributor 300', as it rotates, impresses the code of channel *v* through selector 34' on the spare Chicago to New York channel.

(*r*) *Transmitting selectors of all receiving stations at east terminal shifted to new channel in response to code of new east-west channel*

At New York the code receiving and selecting device connected to the incoming end of the spare Chicago to New York channel receives the code of channel *v* and, in response, its selecting relays, which as has been explained, may function in either of two manners to select a station or a channel, selects the conductor controlling the *v* channel. This conductor operates relay 30v in New York. Relay 30v removes battery from the *v* row of terminals on the banks of selectors 24 and 32. The rotation of the selectors associated with stations in the receiving condition in New York is stopped on the *v* terminals of these transmitting selectors.

(*s*) *Preference as between receiving stations associated with same spare sending channel*

As was described above, all of the stations, which are receiving at any one time, have equal access to a single channel for transmission in the opposite direction. The single channel is assigned to the station which breaks first. It is necessary to prevent interference between receiving stations which have access to the single channel when more than one station breaks at the same time. The function of the chain of relays in series 3, namely 3A, 3B, etc., one of which is assigned to each station is to prevent this interference.

(*t*) *Preference as between codes identifying stations and those identifying channels*

There is another possible kind of interference against which provision has been made. As was described above, a spare channel in any direction may be used for the transmission of two different kinds of codes, namely codes designating a station and codes designating a channel. The spare channel, say from New York to Chicago, may be used to transmit the code of a Chicago station. It may also be used to transmit the code of a Chicago to New York spare channel, the receiving end of which has been selected in New York. Provision is made herein to prevent interference between the transmission of the two different kinds of codes. Thus if some relay in the 8 series is operated to transmit a station code, a relay in the 23 series cannot be operated to transmit a channel code. Relays 9 and 10 and associated relays perform this function in a manner to be described in detail below.

Attention is called to the fact that when a spare channel, such as the east to west channel, is used to transmit the code of a station in the western city, the spare channel is immediately appropriated, after the code of the western station has been transmitted, to the exclusive use of the breaking eastern station for transmitting to the corresponding western station, whereupon a new spare east to west channel is provided. When, however, such a spare east to west channel is used to transmit the code of a new spare west to east channel of which the receiving end has been selected at the eastern terminal, the use of the spare east to west channel for this purpose requires only a very short interval. The spare east to west channel is applied temporarily to this purpose and is then released and continues to serve as the spare east to west channel. While serving as a spare channel in a particular direction, say east to west, the spare channel may be used several times, or not at all, to transmit a west to east channel code, depending upon the number of times that a west to east channel is required, before the spare east to west channel is alternately appropriated for transmission by an eastern patron to his western partner.

Detailed Operation of Circuits and Apparatus

The invention may be more fully understood from the following detailed description of its operation.

1. *Station A in New York initiates a breaking operation to stop transmission from station A' in Chicago*

The drawing shows the equipment of patron A at the east station in the condition for receiving signals. Assume that patron A now opens his key 1 to break the incoming signals. Accordingly, the next incoming marking signal will operate relay 2A. The operation of relay 2A will have the following effect: Battery will be connected over the contact of relay 28, contact of relay 2A, and contact of relay 5A through the winding of relay $3^A$ to ground, thereby operating relay $3^A$.

The operation of relay $3^A$ will have the following effect:

The upper contact will open a normally closed circuit through relay $13^A$ releasing this relay.

2. *The wiper of the individual receiving selector of station A in New York is disconnected from the particular Chicago to New York channel over which it has been receiving and the wiper is connected to the spare Chicago to New York channel in multiple with the wipers of the receiving selectors of other New York stations which are in the transmitting condition*

The release of relay $13^A$ will operate relay $14^A$ which will cause $15^A$ to rotate to a contact where $14^A$ will be released by battery through the low resistance winding of relay 19. The wiper of 15 is shown in dotted lines as arrived at such contact.

3. *The station code relay connected to the A station in New York which identifies the station of A' in Chicago is conditioned to function while the station code relays associated with other stations are prevented from operating*

The lower contact of relay $3^A$ will close a circuit from battery through the windings of relays $46^A$ and $8^A$ to ground over the contacts and armature of relay 29, thereby operating relays $46^A$ and $8^A$. The lower contact of relay $3^A$ also removes battery from the corresponding contacts of all other series 3 relays, such as $3^B$ and $3^C$, thus preventing the operation of any other of the series 8 relays, such as $8^B$ and $8^C$, below this in alphabetical chain.

The operation of relay $8^A$ has the following effect:

The first contact from the left opens the circuit from battery 208, over the back contact of relay $5^A$, thus preventing relay $5^A$ from operating when relay $46^A$ is pulled up. The relay $46^A$ is slow operate and slow release. The second contact from the left causes relay $8^A$ to lock up from battery 201 through back contacts of relays 9 and 29, and after the operation of 9, through the winding of 29 and through back contacts of 11 and 12. The third to eighth contacts set up a code combination on the six sending relays 302 after the operation of relay 9. The ninth contact connects battery 200 through the winding of relay 9 and back contacts of 10, 11 and 12 to ground, thereby operating relay 9.

The operation of relay $46^A$ has the following effect:

The left-hand contact breaks the connection between the winding of $8^A$ and the contact of $3^A$. The right-hand contact makes connection between the back contact of $8^A$ and the winding of relay $5^A$ (through the back contact of $5^A$), thereby preparing a circuit for the operation of relay $5^A$ upon the release of $8^A$.

4. *The code of station A' in Chicago is set up on the common station and channel code transmitter at New York. The relays associated with individual spare channels which set up channel codes on the same transmitter are prevented from interfering*

The operation of relay 9 has the following effect:

The first armature at the right switches the winding of relay $8^A$ to ground through the winding of 29 and the back contacts of 11 and 12, thus keeping relay $8^A$ operated. The second armature from the right connects ground from the back contacts of 11 and 12 and a contact of 10 and over the contacts of $8^A$ to the windings of one or more of the sending relays 302, thereby causing a definite number of these relays to operate in accord with the code combination as expressed by the contacts of relay $8^A$. The third armature of 9 disconnects the winding of relay 10 from battery, preventing its operation, and connects battery to the winding of 11, which does not operate until the operation of 12. The fourth armature disconnects ground through the front contact of relay 10 from the combination contacts of the relays in series 23, thereby preventing any of them from operating the sending relays 302.

5. *The common code transmitter is connected to the spare New York to Chicago channel. The code transmitter sends the code of station A' in Chicago over the channel*

The fifth armature of relay 9 connects the segments of the transmitting distributor 300 through the contacts of the combination of operated sending relays 302 to one of the transmitting relays, such as 203, to which the rotating switch 34 happens to be connected. The sixth armature connects ground to a circuit completed over the contact of relay 60 and through the winding of relay 61 and inner brush arm to the distributor battery connected to the inner solid ring. This will operate relay 61 which will release the arm of the distributor and allow it to rotate over the segments. This will cause the code signal set up by $8^A$ on the sending relays 302 to be sent out by the transmitting relay 203 to the distant station.

When the arm of the transmitting distributor 300 reaches segment L, a circuit will be closed to operate relay 12.

The operation of relay 12 has the following effect:

The relay 60 will operate and open the circuit for the distributor start relay 61, thereby releasing 61 so that the rotating arm may be halted upon completion of one revolution. The operation of 12 will cause relay 11 to operate.

6. *The station code relay connected to station A is disconnected from the New York code transmitter. Station A in New York is connected to the New York to Chicago spare channel*

The operation of 11 will open the circuit previously closed and release relays $8^A$, 9, $46^A$ and the relay of series 30 which is operated. It may be assumed that relay $30_p$ has been operated. It is pointed out that the relays of series 30 are controlled over the contacts of relays of series 58 and that these relays are controlled from the distant station. The operation of these series of relays will be described in more detail hereinafter. It is also pointed out at this point that relay $5^A$ will be in operated condition at this time. Relay 29 is a slow release relay, its purpose being to prevent the first back contact of 9 from being connected to ground until $8^A$ has been released. Relay 11 locks up and removes ground from windings and contacts of series 8 and series 23 relays and also from the windings of relays 9 and 10, thus preventing the operation of any of these relays. Relay 11 may be released by the operation of relay 27 as will be pointed out hereinafter 7. *The individual transmitting selector brushes associated with New York stations which remain in the receiving condition are disconnected from the channel which station A has taken and are rotated while awaiting the assignment from the Chicago terminal of a new spare New York to Chicago channel*

The release of relay $30_p$ has the following effect: It connects battery to the *p* contacts of rotary switches 32 and series 24. Rotary switch 32 and all switches of the series 24 which are associated with patron's circuits whose number 5 relays are not operated, that is, which are associated with patrons in the receiving positions, all begin to rotate and continue to rotate until a signal from the west station arrives designating a new E—W circuit. This signal operates a relay of series 30, say $30^v$, which removes battery from the *v* contacts of switches 32 and the 24 series, and causes the arms of the rotating switches to stop on the *v* contacts. Relay $30^v$ stays operated until a relay of series 8 is operated and released, that is, until a patron breaks and initiates a chain of operations similar to those heretofore described. Relay 28 remains operated during the rotation of 32, preventing the operation of any of the series 3 relays.

Relay $5^A$, which was operated by the release of $8^A$, will lock up. The operation of relay $5^A$ will have the following effect:

The first and second armatures switch the loop of patron A to the E—W circuit, which had previously been selected (namely *p*), and connect a balancing loop to the telegraph repeater of circuit *p* (if it is the type of set using a balanced loop). The third armature provides battery for the locking circuit. The fourth armature prevents operations of $3^A$ by the operation of $2^A$. The fifth armature removes ground from the front contact of $13^A$ which acts as a busy signal through the $15^A$ wiper when patron A is receiving. The sixth armature puts battery on the wiper of $24^A$ which serves as a busy signal for this circuit.

8. *Description of the operation of the chain sequence feature of the station code relays*

If several patrons break simultaneously, say, patrons A, D and G, relays $3^A$, $3^D$ and $3^G$ will operate and lock up. The fourth contact of relay $3^A$ removes battery by its operation from contacts of relays $3^D$ and $3^G$. Therefore, only relay $8^A$ of the series 8 relays will operate. As soon as $3^A$ is released, $8^D$ will operate and as soon as $3^D$ is released, $8^G$ will operate. Thus, the patrons must wait their turns alphabetically.

9. *Summation of operations to present in New York and general indication of future operation at Chicago and New York necessary to complete cycle*

The above description shows in detail how the patron, such as A, at the east or New York station, who is receiving, may open his key and send a break signal. It shows the sequence of operations whereby the code sending apparatus at New York may transmit over the aforementioned first preselected idle channel the code signal for patron A. It also describes how at the same time the patron A at New York will be connected to this first preselected idle channel for transmission from New York to the west, or Chicago station. The following detailed description will now tell how in response to this code signal the code receiving device at the west, or Chicago station, will cause selecting mechanism to connect to this first preselected idle circuit the partner at Chicago of patron A. It will also show in detail how selecting mechanism at Chicago operates to pick out at Chicago a third idle channel and connects thereto the local code receiving apparatus which was previously connected to the first mentioned idle channel. It will also show how code sending apparatus at Chicago will now operate over the previously mentioned second idle channel in the direction from Chicago to New York to send thereover the code signal for the third selected idle channel. It will show how this code signal will operate the code receiving device at New York and cause selecting apparatus thereat to connect the code sending apparatus at New York, which was previously connected to the first mentioned idle channel, to the third selected ide channel, so that said third selected idle channel will be in readiness to be connected to the next New York patron to send a break signal.

In considering the equipment at the west station the Figs. 1 and 2 of the drawing may be applied to the equipment thereat. However, in referring to equipment located at the west station the designation prime will be added to the reference characters in the description.

10. *In response to code signals for station A′ in Chicago, the common code receiving and code registering apparatus connected to the incoming end of the New York to Chicago spare channel, receives and registers the code of Chicago station A′*

The incoming signal at the west station designating the patron, such as A, who is breaking at the east station will operate one of the receiving relays, such as relay 206′. This relay will operate relay 20′ in accordance with the incoming code signal. This will first operate the start relay 62′ of the receiving distributor and allow the brush to start rotating. The operation of relay 20′ in accordance with the incoming code signal and the operation of the distributor will then cause the code signal to be set up on relays 35′ to 40′. This operation will in turn operate a combination of the groups of relays 47′ to 59′. This last mentioned combination of relays will be operated over one path to ground through all of the groups of relays. When the distributor in its rotation reaches segment 7 it causes the operation of relay 41′, which causes the operation of relay 42′ and of relays $59^{A\prime}$ and $58^{v\prime}$. The operation of 42′ will release relays 35′ to 41′.

11. *The code registering relays condition the common selecting apparatus at Chicago, which may be operated to select either a station at Chicago or the outgoing end of a Chicago to New York spare channel, to select station A′ at Chicago*

Regarding relays $59^{A\prime}$ and $58^{v\prime}$, it is pointed out that the windings of this group of relays are connected in parallel in pairs. One relay of each pair (58′) must be a sensitive relay operating on comparatively small current and the other relay (59′) an insensitive one operating on a much larger current. If relay 47′ is released, a series resistance allows the operation of the sensitive relay of the pair which is connected to the contacts of this relay through the contacts of relays 48′ to 53′, but the inclusion of this resistance prevents the operation of the insensitive relay. In the case shown on the drawing, however, relay 47′ is operated and therefore both 58v′ and 59A′ are operated. The operation of these two relays will cause the operation of relay 13A′.

12. *The rotating magnet of the individual receiving selector of station A′ in Chicago is conditional so that its associated brush only, of the group which were in connection with the spare New York to Chicago channel, will remain so connected, station A′ in Chicago is connected to station A in New York*

The operation of relay 13A′ has the following effect:

It will lock itself up. It will break the stepping circuit of selecting switches 15A′ and 16A′. At its lower contact it will open the locking circuit of relay 5A′ and release relay 5A′. Relay 13A′ will remain operated until released by the operation of relay 3A′ when the A′ patron breaks.

The release of relay 5A′ has the following effect:

It puts ground on the rotating wiper of selector 15A′ through the contacts of 13A′. All 15′ switches at the west station of all patrons whose equipment is in the condition for transmitting in the west-east direction are resting on contact "p′". This ground causes all except 15A′ to step forward and also causes selector 17′, which is associated with the receiving distributor, to step forward. The release of relay 5A′ also connects patron A′ at the west station to the receiving end of the east-west channel *p* to which patron A at the east end is connected.

13. *The wiper of the individual transmitting selector associated with station A′ in Chicago is disconnected from the individual channel, by means of which A′ in Chicago has been transmitting to A in New York, and the wiper is rotated until it is connected to the Chicago to New York spare channel, to which all other transmitting selectors associated with Chicago stations which are in the receiving condition are already connected in multiple*

When station A′ in Chicago is broken, it has been shown that the wiper of the individual receiving selector 16A′ associated with station A′ is conditioned so that it remains connected to the Chicago end of the New York to Chicago spare channel which completes the allocation of this channel to the use of A and A′ so that A in New York may transmit to A′ in Chicago.

It is necessary to perform one more switching operation on the apparatus associated with station A′ in Chicago. The individual transmitting selector 26A′, associated with station A′, must be conditioned so that its wiper, which was connected to an individual transmitting channel, by means of which station A′ in Chicago was transmitting to A in New York, is connected to the Chicago end of the Chicago to New York spare channel. The wipers of all of the other Chicago stations which are at the time in the receiving condition are all connected in parallel to a single Chicago to New York channel which is serving as the spare Chicago to New York transmitting channel. It is necessary therefore that the individual transmitting selector wiper at station A′ be disconnected from the channel over which station A′ was transmitting and that the wiper be rotated individually until it is connected to the spare Chicago to New York transmitting channel in multiple with all other Chicago stations which are in the receiving condition, so that station A′ may have equal access to this channel with other Chicago stations in the same condition.

The manner in which this is performed is as follows:

Relay 5A′ is released at this time as station A′ has been transferred from the transmitting to the receiving condition. All reays in the 30′ series are released at this time except the 30′ relay associated individually with the channel which is serving as the Chicago to New York spare channel. That this is so will be understood when it is recalled that whenever a channel which has been serving as a spare is appropriated for use, its relay in the 30 series which is operated while it is serving as a spare is released.

A circuit may therefore be traced from battery through the top contact and armature of the relay in the 30′ series associated with the channel over which station A′ was transmitting, through the contact on switch 24A′ associated with the channel, through the wiper of switch 24A′, through the bottom armature and back contact of relay 5A′ through the winding and contacts of rotor magnet 23A′ to ground. Rotor magnet 23A′ operates, rotating its associated wheel and stepping the wipers of switches 24A′, 25A′ and 26A′ off the terminals corresponding to the channel over which station A′ was transmitting to New York. As the wiper 24A′ engages each succeeding terminal on its bank in succession, until it engages the terminal corresponding to the channel which is serving as the Chicago to New York spare, it will meet battery on the terminal. Rotor magnet 23A′ therefore will continue to operate until the spare channel is found. The 30′ relay associated with the spare channel will be operated disconnecting battery from the associated terminal on bank 24A′ and preventing further operation of rotor magnet 23A′. It will be understood, of course, by any one skilled in the switching art, that if there are more terminals on bank 24A′ than there are channels the extra terminals will be made busy by connecting battery thereto.

14. *The receiving end of a new spare New York to Chicago channel is selected at Chicago. The common code receiving apparatus and the brushes of all of the individual receiving selectors of stations which remain in the transmitting condition are connected to the receiving end of the new spare channel at Chicago. A multicontact relay associated with the receiving end of the new spare channel is conditioned to set up the code of the new channel on the common code transmitting apparatus at Chicago*

Selector 17′ continues to step forward until it reaches a contact (*v*′) not grounded through a solid ground but through one of the resistances 92′. At this point relays 19′ and 21′, which are insensitive relays, release thus stopping the rotation of 17′. At the same time relays 22v′ and 23v′, which are high impedance sensitive relays, are operated by the battery through the winding of relay 19′.

The 15′ switches rotate until they reach a contact *v*′ where they stop due to battery through the winding of relay 19'. The stepping relays numbered 14' are of high impedance and will operate through resistances 92', but will not operate when battery is connected to a 92' resistance through the winding of 19'.

15. *The code relay associated with the Chicago receiving end of the newly selected New York to Chicago channel sets up the code of the selected channel on the Chicago code transmitting apparatus. Interference from station code apparatus is meanwhile prevented. The code of the new channel is transmitted to New York by means of the spare Chicago to New York channel*

The operation of relay 23v' has the following effect:

It closes a locking circuit for itself to ground over the contact of relay 26' from battery connected to its left-hand armature. Its farthest right-hand armature causes the operation of 10' through the contact of 9' if 9' is not operated. This prevents interference with a "patron selecting signal" when it is being sent by the distributor. If relay 9' is operated, relay 10' operates as soon as 9' releases. As soon as 10' operates, ground is connected through the contacts of 10' and 23v' to a combination of the sending relays 302'. The operation of 10' will also operate the start magnet 61' and allow the distributor arm to rotate. This will cause the signal combination for circuit *v* to be sent out to the east station.

The operation of relay 10' will also have the following effect:

In addition to functions of other armatures already described, the first armature to the right opens the winding of the circuit of relay 9', preventing its operation while 10' is operated, thus preventing interference with the outgoing circuit selecting signal by the outgoing patron-selecting signal. The second contact to the left connects battery 204' over the distributor segments to the loop of the west-east channel to which the receiving distributor is connected at the east end, thus allowing the selecting signal for circuit *v* to be transmitted to the east. When the distributor in its rotation reaches segment L', relay 12' is operated momentarily, releasing 23v' and 10'. Relay 11', however, is not operated. The operation of 12' will operate 60' which will release the start magnet 61' to stop the distributor. To prevent this cycle of operations from being repeated, a slow-operating relay 22v' is inserted in the lead which connects the winding of 23v' to the contacts of rotating switch 17', opening this circuit until a new cycle is started.

16. *The code of the new New York to Chicago channel is received in New York. The code receiving and common line and channel selecting apparatus connected to the New York terminal of the Chicago to New York spare channel functions to select the transmitting end of the channel, the receiving end of which has already been selected in Chicago. The rotation of the brushes of the individual station transmitting selectors and of the code transmitting selector are stopped on the selected channel*

At the east end of the system circuit-selecting signals for the *v* east-west channel come in over the west-east channel to which the east receiving distributor is connected (shown as channel *p* in the drawings). The components of this signal combination operate relay 28 which operates a definite combination of relays 35 to 41. These set up a combination of relays 47 to 59 which causes relay 30v to operate.

The operation of relay 30v has the following effect:

It locks up and disconnects battery from the *v* contact of rotary switches 32 and series 24. Rotary switch 32 and all of the switches of series 24 which are associated with patrons in the receiving position, i. e., whose relays of series 5 are released, have been stepping around since 5A operated at the time of patron A's break signal. All of these rotating switches now stop on contact *v* where they wait until another patron breaks. Relay 30v is released by the operation of relay 11 after the next patron breaks.

The principles of the various cycles of operation heretofore described in detail may be applied to cycles of operation between other patrons of the system.

While the invention has been disclosed as embodied in certain specific arrangements which are deemed desirable, it is understood that it is capable of embodiment in many and other widely varied forms without departing from the spirit of the invention as defined by the appended claims.

What is claimed is:

1. A telegraph system comprising two stations, a plurality of channels interconnecting said stations, a plurality of subscribers at said stations arranged to communicate in pairs, and means for establishing over any of said channels connections solely between the individual subscribers of a pair, said means comprising selective mechanism at each station responsive to the taking of a subscriber's set for use for choosing an idle one of said channels and connecting the subscribers of a pair thereto.

2. A telegraph system comprising two stations, a plurality of channels interconnecting said stations, a plurality of subscribers at said stations arranged to communicate in pairs, means for establishing over any of said channels connections solely between the individual subscribers of a pair, said means comprising mechanism at each station responsive to the taking of a subscriber's set for use for connecting the subscribers of a pair to a preselected idle channel, and selective means controlled by said mechanism for preparing another idle channel for the next desired connection.

3. The method of providing telegraph service between a plurality of sets of subscribers at different stations over a lesser number of channels interconnecting said stations which comprises subjecting all of the channels between said stations to the control of selecting apparatus common to each station whereby an idle channel in either direction will automatically be provided available for sending by any subscriber to said subscriber's partner at the distant station upon the taking of his set for use.

4. A telegraph system comprising two stations, a plurality of subscribers at each station, a plurality of channels interconnecting said stations, one of said channels in an idle condition having been preselected, code sending mechanism connected to said preselected channel at one station, code receiving mechanism connected to said preselected channel at the other station, means individual to each subscriber at one station and controlled by the taking of a subscriber's set for use for actuating said code sending mechanism to transmit over said preselected idle channel to the code receiving mechanism at the other end thereof the individual code signal for the subscriber's set taken for use, and means controlled by the transmission and reception of said code signal for connecting said preselected idle channel to the subscriber's set taken for use and to the subscriber's partner at the other station.

5. A telegraph system comprising an "east" station and a "west" station, a plurality of subscribers at each station, a plurality of channels interconnecting said stations, a first channel for east-west transmission and in an idle condition having been preselected, a second channel for west-east transmission and in an idle condition having been preselected, code sending mechanism at said east station and code receiving mechanism at said west station connected to said first preselected channel, code receiving mechanism at said east station and code sending mechanism at said west station connected to said second preselected channel, means individual to each subscriber at said "east" station and controlled by the taking of a subscriber's set for use for actuating said east code sending mechanism to transmit over said first preselected channel to the west code receiving mechanism the individual code signal for the subscriber's set taken for use, selecting mechanism at said "west" station controlled by the operation of said west code receiving mechanism in response to said transmitted code signal for selecting a third one of said channels in an idle condition for east-west transmission, means controlled by the operation of said "west" selecting mechanism for actuating said west code sending mechanism to transmit over said second selected channel to the east code receiving apparatus the code signal for said third selected idle channel for east-west transmission, means controlled by the operation of said "west" selecting mechanism for connecting said "west" code receiving mechanism to said third selected idle channel, means controlled by the operation of said "east" code receiving mechanism for connecting said "east" code sending mechanism to said third selected idle channel, and means controlled by the transmission and reception of said first mentioned subscriber's code signal for connecting said said first preselected channel to the "east" subscriber's set taken for use and to the subscriber's partner at the "west" station.

6. A telegraph system comprising an "east" station and a "west" station, a plurality of subscribers at each station, a plurality of channels interconnecting said stations, a first channel for east-west transmission and in an idle condition having been preselected, a second channel for west-east transmission and in an idle condition having been preselected, code sending mechanism at said east station and code receiving mechanism at said west station connected to said first preselected channel, code receiving mechanism at said east station and code sending mechanism at said west station connected to said second preselected channel, means individual to each subscriber at said "east" station and controlled by the taking of a subscriber's set for use for actuating said east code sending mechanism to transmit over said first preselected channel to the west code receiving mechanism the individual code signal for the subscriber's set taken for use, said means comprising a plurality of relays, each one individual to a subscriber and each having a combination of contacts so arranged that each combination of contacts will form a code combination signal individual to a subscriber's line, means controlled by each of said relays when operated for preventing the operation of the others of said plurality of relays, and circuits whereby the contacts of each of said relays may control said code sending mechanism, selecting mechanism at said "west" station controlled by the operation of said "west" code receiving mechanism in response to said transmitted code signal for selecting a third one of said channels in an idle condition for east-west transmission, means controlled by the operation of said "west" selecting mechanism for actuating said west code sending mechanism to transmit over said second selected channel to the east code receiving apparatus the code signal for said third selected idle channel for east-west transmission, means controlled by the operation of said "west" selecting mechanism for connecting said "west" code receiving mechanism to said third selected idle channel, means controlled by the operation of said "east" code receiving mechanism for connecting said "east" code sending mechanism to said third selected idle channel, and means controlled by the transmission and reception of said first mentioned subscriber's code signal for connecting said first preselected channel to the "east" subscriber's set taken for use and to the subscriber's partner at the "west" station.

LELAND C. ROBERTS.